United States Patent
DePascale (10) Patent No.: US 10,799,016 B2
(45) Date of Patent: Oct. 13, 2020

(54) AUTO-ADJUSTING VEHICLE PRESSURE WASHER

(71) Applicant: Thomas DePascale, Sayreville, NJ (US)

(72) Inventor: Thomas DePascale, Sayreville, NJ (US)

( * ) Notice: Subject to any disclaimer, the term of this patent is extended or adjusted under 35 U.S.C. 154(b) by 224 days.

(21) Appl. No.: 16/182,358

(22) Filed: Nov. 6, 2018

(65) Prior Publication Data

US 2020/0139938 A1    May 7, 2020

(51) Int. Cl.
| | |
|---|---|
| A46B 13/04 | (2006.01) |
| B08B 3/02 | (2006.01) |
| B60S 1/66 | (2006.01) |
| A46B 15/00 | (2006.01) |
| B60S 3/04 | (2006.01) |

(Continued)

(52) U.S. Cl.
CPC .............. *A46B 13/04* (2013.01); *A46B 13/06* (2013.01); *A46B 15/0002* (2013.01); *A46B 15/0012* (2013.01); *B08B 1/002* (2013.01); *B08B 3/026* (2013.01); *B08B 3/028* (2013.01);
(Continued)

(58) Field of Classification Search
CPC ......... A46B 13/02; A46B 13/04; A46B 13/06; A46B 15/0002; A46B 15/0004; A46B 15/0012; A46B 2200/3046; B60S 1/62; B60S 1/66; B60S 3/04; B60S 3/044;
(Continued)

(56) References Cited

U.S. PATENT DOCUMENTS

| | | | | |
|---|---|---|---|---|
| 3,648,316 A | * | 3/1972 | Habian | ..................... B64F 5/30 15/53.2 |
| 5,381,962 A | | 1/1995 | Teague | |

(Continued)

FOREIGN PATENT DOCUMENTS

| | | |
|---|---|---|
| CN | 203213048 U | 9/2013 |
| CN | 104129370 A | 11/2014 |

(Continued)

OTHER PUBLICATIONS

Partial machine translation of JP 62-91349, Apr. 25, 1987. (Year: 1987).*

(Continued)

*Primary Examiner* — Mark Spisich
(74) *Attorney, Agent, or Firm* — Weitzman Law Offices, LLC (57) ABSTRACT

A pressure washing system is disclosed for integration into a recreational vehicle or other large mobile vehicle. The wand of the system includes a rotating brush and one or more sensors to determine a distance from, pressure against, or orientation with respect to the vehicle. While a pump is supplying water to be output by the wand, the distance, pressure, orientation, or other sensor readings are continuously used to modify output characteristics of the wand, including the output water pressure and the speed of rotation of the brush. As a result, no more pressure is supplied by water or brush bristles than is necessary, avoiding overuse of water or damage to outer surfaces of the vehicle. Sensor readings may include one or more of a camera feed, sonar, lidar, pressure feedback, and accelerometer data. The system may also be responsive to a mobile app on a user's mobile computing device.

12 Claims, 9 Drawing Sheets

(51) Int. Cl.
*A46B 13/06* (2006.01)
*B08B 1/00* (2006.01)

(52) U.S. Cl.
CPC ................. *B60S 1/66* (2013.01); *B60S 3/044* (2013.01); *B60S 3/047* (2013.01); *A46B 2200/3046* (2013.01)

(58) Field of Classification Search
CPC . B60S 3/047; B60S 3/048; B08B 3/02; B08B 3/026; B08B 3/028
USPC ........ 15/24, 28, 29, 50.1, 53.1; 239/73, 172, 239/175, 525, 530, 532
See application file for complete search history.

(56) References Cited

U.S. PATENT DOCUMENTS

| | | | |
|---|---|---|---|
| 7,083,120 | B2 | 8/2006 | Gilpatrick et al. |
| 7,143,460 | B1 * | 12/2006 | Kato ....................... A46B 13/04 15/29 |
| 2002/0158143 | A1 * | 10/2002 | Moriarty .............. A46B 11/066 239/226 |
| 2004/0045581 | A1 | 3/2004 | Boomgaarden et al. |
| 2005/0156060 | A1 | 7/2005 | Attar |
| 2006/0118149 | A1 | 6/2006 | Benson et al. |
| 2008/0040872 | A1 * | 2/2008 | Hjerpe .................... B05B 7/166 15/3 |
| 2008/0066790 | A1 * | 3/2008 | Rems ..................... B08B 13/00 134/123 |
| 2009/0065607 | A1 | 3/2009 | Gardner et al. |
| 2009/0272409 | A1 * | 11/2009 | Petit ........................ B08B 3/024 134/32 |
| 2010/0229892 | A1 | 9/2010 | Reese et al. |
| 2014/0318654 | A1 | 10/2014 | Rasmussen |
| 2015/0223596 | A1 * | 8/2015 | Topf .................... B05B 11/3057 427/429 |
| 2015/0306614 | A1 | 10/2015 | Pierce |
| 2017/0095070 | A1 * | 4/2017 | Machiorlette ...... A46B 15/0002 |

FOREIGN PATENT DOCUMENTS

| | | | |
|---|---|---|---|
| EP | 356664 | * | 3/1990 |
| FR | 2291719 | * | 6/1976 |
| JP | 62-01349 | * | 4/1987 |

OTHER PUBLICATIONS

WORX 20V Hydroshot Portable Power Cleaner Value Bundle Item WG629.1 (downloaded at https://www.worx.com/hydroshot-portable-power-cleaner-bundle-wg629-1.html?gclid=EAIalQobChMl-YfSrsHA3gIVTF6GCh1gmACXEAAYAiAAEgl99fD_BwE&gclsrc=aw.ds on Nov. 1, 2018).
Ryobi Tools, 1600 PSI Electric Pressure Washer Model: #RY141600 |Home Depot SKU #: 1001185673 (downloaded at https://www.ryobitools.com/outdoor/products/details/1600-psi-electric-pressure-washer on Nov. 1, 2018).
Commercial 4000 PSI 3.5 GPM 12-Volt Kohler Gas Driven Hot Water Pressure Washer—EZO4035GKGP12—The Home Depot (downloaded at https://www.homedepot.com/p/Commercial-4000-PSI-3-5-GPM-12-Volt-Kohler-Gas-Driven-Hot-Water-Pressure-Washer-EZO4035GKGP12/303280476 on Nov. 1, 2018).
K 5 Premium FullControl Plus Car&Home*AU | Karcher Australia (downloaded at https://www.kaercher.com/au/home-garden/pressure-washers/k-5-premium-fullcontrol-plus-car-home-au-13246380.html on Nov. 1, 2018).
Pressure Washers | High Pressure Washers | Karcher Australia (downloaded at https://www.kaercher.com/au/home-garden/pressure-washers.html on Nov. 1, 2018).
Suttner America ST-54 Dual Lance Parts Detail (downloaded at https://suttner.com/products/product-details/?product=ST-54+Dual+Lance on Nov. 1, 2018).
"Remote control operates pressure washers at a distance" (last updated Jul. 19, 2008) (downloaded at https://www.bakeryandsnacks.com/Article/2006/11/30/Remote-control-operates-pressure-washers-at-a-distance#on Nov. 1, 2018).
Sun Joe 2030 PSI 1.76 GPM 14.5 Amp Electric Pressure Washer with Pressure-Select Technology-SPX4000—The Home Depot (downloaded at https://www.homedepot.com/p/Sun-Joe-2030-PSI-1-76-GPM-14-5-Amp-Electric-Pressure-Washer-with-Pressure-Select-Technology-SPX4000/301528867 on Nov. 1, 2018).
Sun Joe SPX-RB1 | Rotary Pressure Washer Brush Kit for SPX Series (downloaded at https://www.snowjoe.com/products/sun-joe-rotary-wash-brush-kit-for-spx-series-pressure-washers on Nov. 1, 2018).
Sun Joe SPX6000C-XR iON Cordless Pressure Washer [#1 Rated] 1160 PSI (downloaded at hPttpRs://wOww.sTnowEjoeC.comT/prIodOuctsN/sun-joPe-ioLn-4A0v-5N-0-ah-O1160P-psiT-corldlOess-pNressSure-washer on November 1, 2018).
The Road Wave (downloaded at https://theroadwave.com on Nov. 1, 2018).

* cited by examiner

AUTO-ADJUSTING VEHICLE PRESSURE WASHER

FIELD OF INVENTION

This application relates to a pressure washing device, and more specifically, for a pressure washer integrated into a vehicle's water system and remotely controlled by a user during the washing of the vehicle.

BACKGROUND

Drivers of recreational vehicles (RVs) or other vehicles like boats, tractors, all-terrain vehicles (ATVs), tractor trailers, trucks, buses, etc., may find after a long drive that a significant amount of contamination has built up on the outer surfaces of the vehicle, such as mud, dead insects, salt or other mineral deposits, or other detritus. This build up can lead to dangerous operation if a windshield or window is obscured, as well as generally affecting the aesthetic appearance of the vehicle and the pride of the owner in the vehicle.

Due to the surface area of the vehicle, height of the vehicle, or the detritus becoming cemented onto the surface, it may be impossible or infeasible to run the vehicle through a car wash or to remove by hand with a rag, sponge, or brush. A pressure washer, combining the advantages of ranged use, power, portability, and flexibility in aiming, can facilitate cleaning the surfaces of the vehicle. However, integration and use of a pressure washer on a vehicle is not trivial, when the pressure washer needs a water source, power source, and must carefully calibrate pressure at a level lower than is typical for other pressure washer uses, to avoid damaging any surfaces of the vehicle.

Even with the convenient advantages of a pressure washer, and even if the challenges of integrating a pressure washer into a vehicle and downgrading its pressure are solved, there is still a need to make the process of using it as convenient as possible. When a driver is walking around in the dark after a long night of driving or has to stand outside the vehicle in extreme cold, heat, or other unpleasant weather conditions, the driver will want to be able to attach any components and activate the system with a minimum of difficulty to quickly complete the wash and get back inside the vehicle.

SUMMARY OF THE INVENTION

In accordance with one aspect of this disclosure, a pressure washing system for a vehicle is disclosed, comprising a pump, a processor, and a wand in fluid communication with the pump, directing water pressurized by the pump, and comprising a pressure sensor and a brush. While the pump is active, the processor continuously determines a pressure of the brush against an external surface of the vehicle, and, based at least in part on the determined pressure, automatically causes a modification of an output pressure of water from the wand.

In accordance with another aspect of this disclosure, a pressure washing system for a vehicle, comprising a pump, a processor, and a wand in fluid communication with the pump, directing water pressurized by the pump, and comprising a pressure sensor and a rotating brush. While the pump is active, the processor continuously determines a pressure of the brush against an external surface of the vehicle, and, based at least in part on the determined pressure, automatically causes a modification of a speed of rotation of the brush.

In accordance with another aspect of this disclosure, a pressure washing system for a vehicle is disclosed, comprising a pump, a processor, and a wand in fluid communication with the pump, directing water pressurized by the pump, and comprising one or more distance-finding sensors. While the pump is active, the processor continuously determines a distance between the wand and an external surface of the vehicle, and, based at least in part on the determined distance, automatically causes a modification of an output pressure of water from the wand.

DETAILED DESCRIPTION

Figure 1:
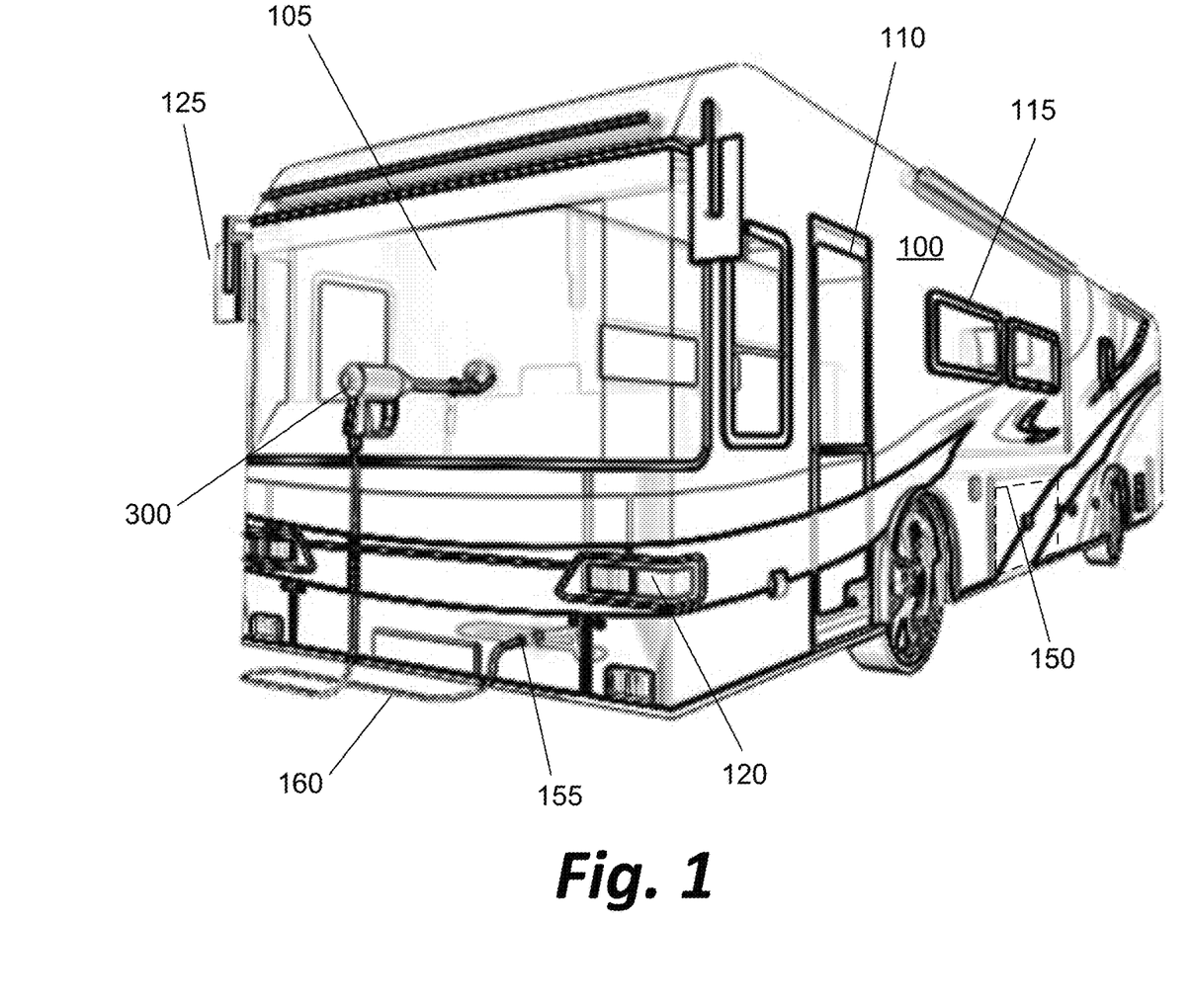
FIG. 1 depicts a vehicle to which modifications may be made to enable aspects of the presently disclosed pressure washing system.
Figure 2:
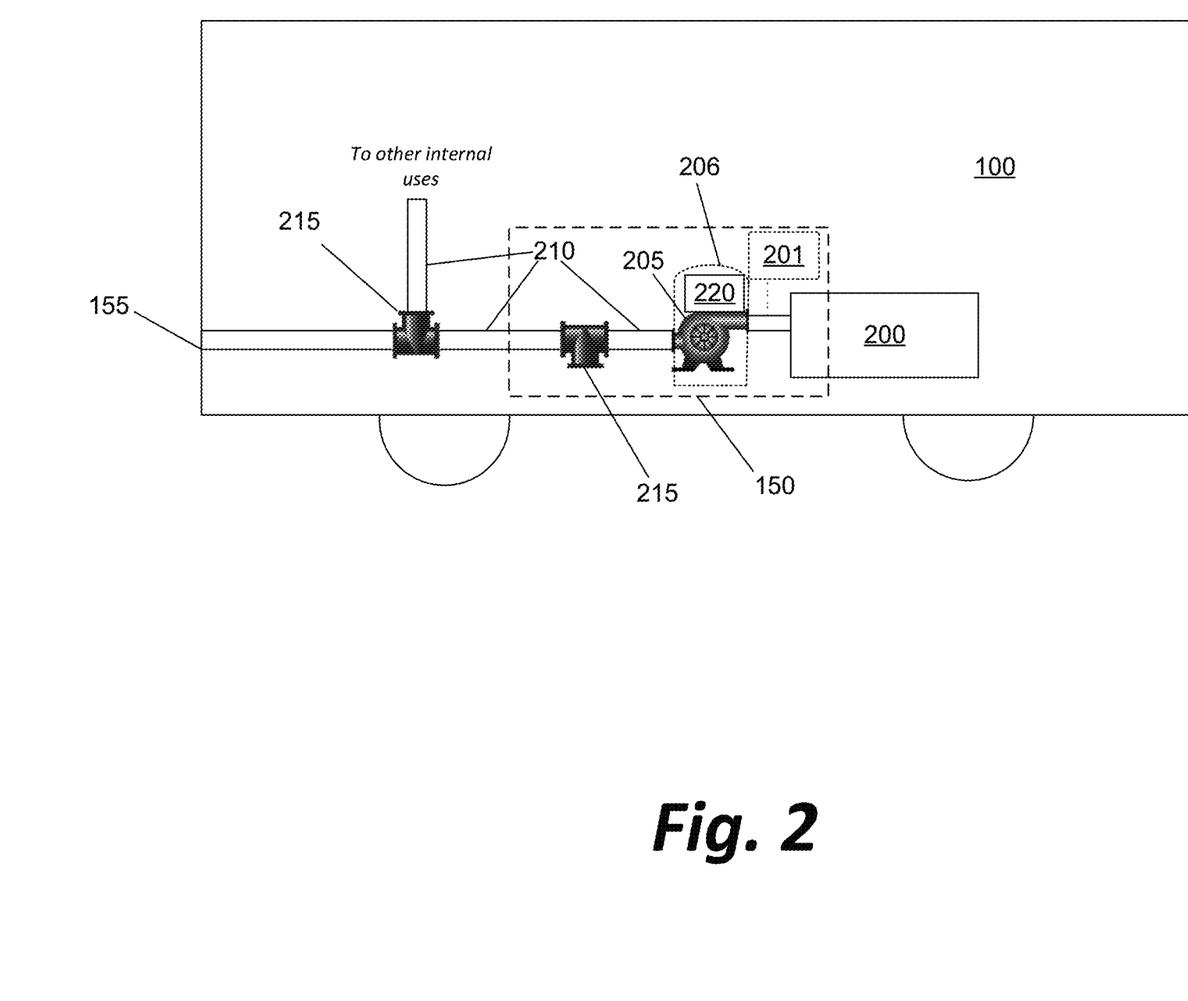
FIG. 2 depicts, in simplified form, a preferred internal configuration of components within the vehicle illustrated in FIG. 1.

FIG. 1 depicts a representative vehicle 100 shown as a recreational vehicle (RV) to which modifications may be made to enable aspects of the presently disclosed pressure washing system, while FIG. 2 depicts, in simplified form, a preferred internal configuration of components within the vehicle 100 illustrated in FIG. 1.

Vehicle 100 (which will typically have a windshield 105, door 110, windows 115, headlights 120, side mirrors 125, etc.) may as a default feature have a storage area that while driving is concealed by a hatch or panel 150 (the edges of which are shown as a dashed outline in FIG. 1). In a preferred embodiment, a pressure washer wand 300 is connected to a pump 205 (not visible in FIG. 1, but shown in FIG. 2) by a hose 160 through a port 155 in the external surface of vehicle 100.

Turning to FIG. 2, within the storage area may be a permanent water tank 200 and pump 205 for supplying water from tank 200 to those riding in the vehicle 100. For example, a pipe 210 may lead from pump 205 to a number of sinks, facilities, or appliances within the vehicle to which the pump supplies water.

If vehicle 100 lacks a tank 200, then a tank 200 may be installed in the storage area. In an alternative embodiment, a removable/replaceable tank 201 may be connected to pump 205 instead of or in addition to tank 200, to allow temporary access to water by the system even when the main tank 200 is empty or is not present. The tank 201 may be, by way of non-limiting example, only approximately 2.5 gallons in volume, or may be larger or smaller depending on constraints on the internal space available for installing tank 201 within vehicle 100, or may be larger or smaller depending on a desired tradeoff between portability and the amount of time for which the tank will be able to supply water.

If vehicle 100 lacks pump 205, or if pump 205 cannot be easily modified to add features described below, a pump 205 may be installed, replaced, or upgraded with appropriate components such as software controller 220. Pump 205 may, in some embodiments, be a part of an independent and removable pressure washer 206 that is mounted or stored within vehicle 100 during use. Pressure washer 206 may have been modified to add the necessary control interface as part of software controller 220 to serve as pressure washer 206 and provide pump 205, or may already include a software controller 220 before installation into the vehicle 100.

Pump 205 may have, in addition to the normal components present in a water pump, an at least rudimentary software controller 220 for controlling and modifying the outflow pressure of the pump. The software controller 220 may have a physical interface for user control (such as knobs or switches to activate, deactivate, increase pressure on a continuous spectrum, decrease pressure, or toggle between predefined "high" or "low" pressure settings) and may also have a wireless receiver for receiving similar commands via WiFi, Bluetooth, Near Field Communication, or other protocols for connection between physically proximate computing devices. The receiver may be configured to receive instructions from any source capable of transmitting them directly to the receiver, or may have additional security features, such as being mated to an application running on a mobile computing device and requiring authentication by a user of the device or security credentials stored in the device before acting on any received commands.

One or more pipe fittings 215, such as a Tee fitting, may be installed in pipe 210 to allow connection of a hose 160 and a pressure washing wand 300 including a nozzle to direct or focus the spray from pump 205. In a preferred embodiment, a port 155 may be installed in the front or side of the vehicle 100 by drilling or cutting into the outer surface of the vehicle and running piping from pump 205 (whether directly, or via a pipe fitting 215) to the created opening. The port 155 may be configured to fit and secure the hose 160 snugly so that a user does not need to bend down, open panel 150, and reach into the storage compartment to attach a hose to the pressurized water supply. The port 155 may include threads, a quick connect, or other locking mechanism so that the hose 160 may be easily connected thereto. In other embodiments, an appropriate pipe fitting 215 may be accessible by opening the panel 150, or the hose may even be connected directly to the pump 205. The hose and pressure washer wand 300 may be stored in the storage space, or alternatively kept in the residential area of the vehicle.

Figure 3:
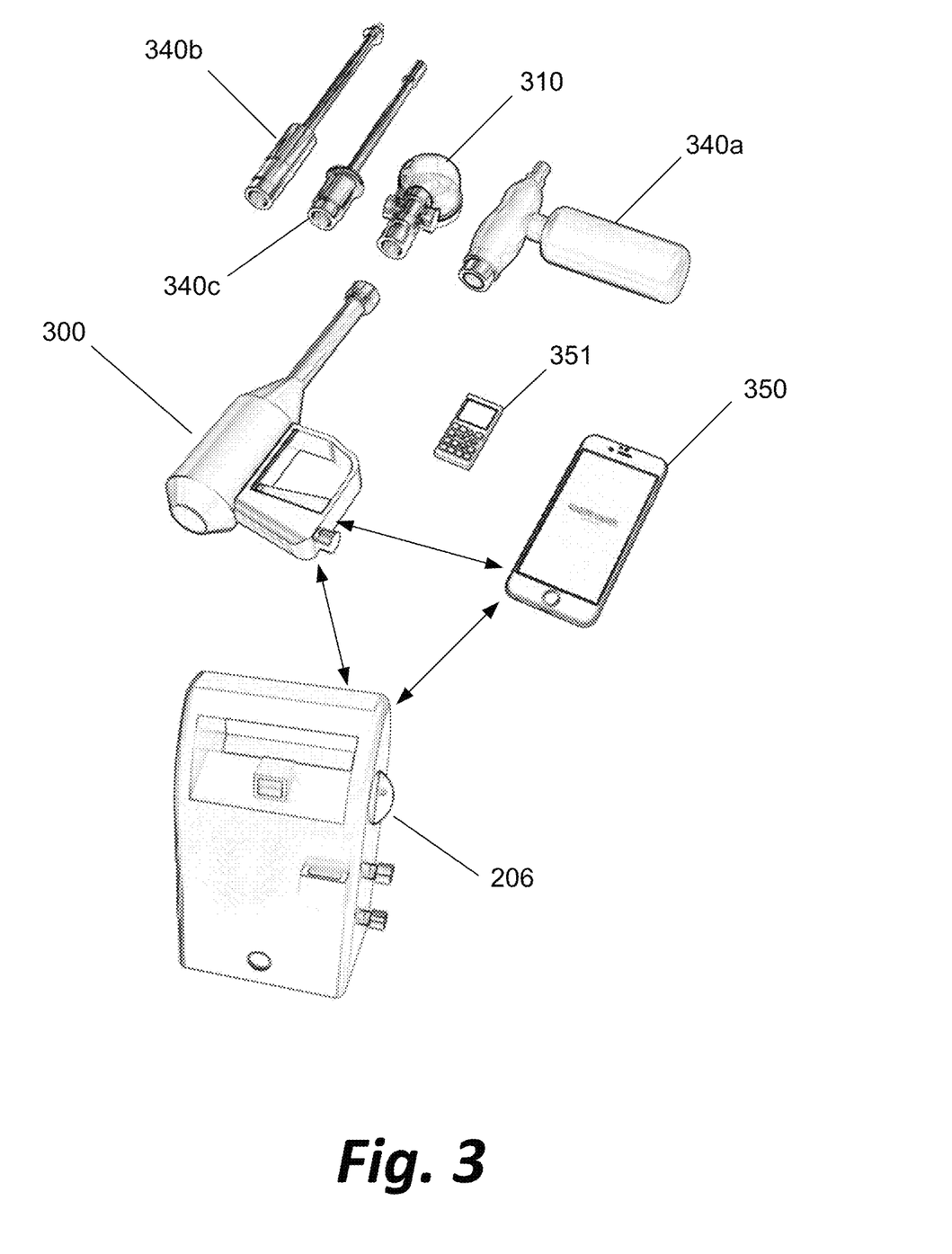
FIG. 3 depicts a pressure washer, wand, and multiple options for controlling the output of the pressurized water.

FIG. 3 depicts a pressure washer 206, wand 300, and multiple options for controlling the output of the pressurized water.

Wand 300, pressure washer 206 (which contains pump 205), and mobile computing device 350 may all be, in a preferred embodiment, in direct wireless communication with one another, such as via Bluetooth, Near Field Communication, or other similar wireless communication protocol (shown in FIG. 3 as arrows connecting wand 300, pressure washer 206, and mobile computing device 350). In other embodiments, they may each be connected to an existing wireless network, such as a WiFi hotspot or similar network created by a dedicated router.

Mobile computing device 350 may be used to run an application to control of the output of water from wand 300, by causing the pump 205 within pressure washer 206 to modify output pressure/volume, and/or by causing wand 300 to modify the output pressure or direction of the water received from pump 205, according to methods described below in greater detail. In alternative embodiments, a remote control 351 that is specialized for this purpose may be used instead of a general-purpose computing device.

In a preferred embodiment, wand 300 may take multiple interchangeable heads, including head 310 which comprises a brush 315 (see also FIGS. 4 and 7, below), to allow simultaneous scrubbing of a surface and washing with the pressurized water. In other embodiments, heads 340a, 340b, and 340c may be used to add chemicals such as soap to the output water, or to shape the output of water in different ways.

Figure 4:
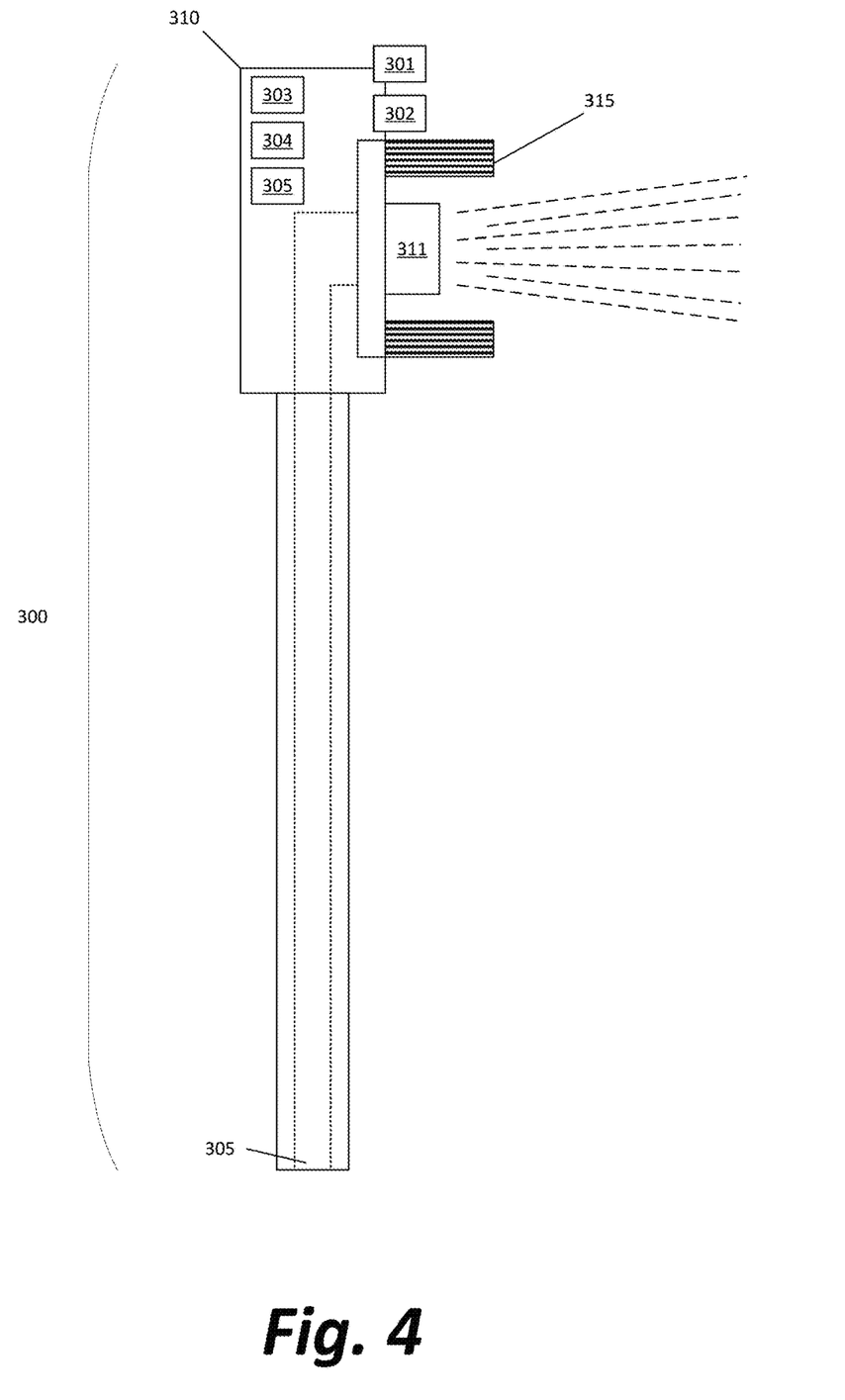
FIG. 4 depicts, in simplified form, a pressure washer wand in accordance with the present disclosure.

FIG. 4 depicts, in simplified form, the wand 300 in accordance with the present disclosure.

The wand 300 preferably includes a base 305 and a head 310. A flexible hose or other conduit (not shown) is connected to the base 305 and directs water flow (pressurized by pump 205 of FIG. 2) through the wand and out the head 310.

The head 310 may include a rotating brush 315. The rotating brush 315 is, in a preferred embodiment, powered by an electric motor which can modify the speed of rotation, alternate rotation direction to scrub back and forth, or modify its total power output if resistance to brush movement is encountered. In other embodiments, the brush 315 may be rotated by mechanical action of the water flow in the wand causing, for example, a paddlewheel or turbine to spin and directly rotate the brush in a predetermined manner using a gear system. With this assembly, unless also using a motor as a backup or auxiliary power source, the brush 315 would rotate if and only if there is water flow, at a speed proportional to the speed of water flow, and only in a single direction.

The wand 300 may have a rechargeable battery built into it, or in alternative embodiments, may have an opening into which one or more disposable batteries may be inserted, or may have an external power cord for plugging into a power source, or may have a hose that incorporates a power cord running in parallel to the channel for water, such that the pump 205 supplies power to the wand 300.

Nozzle 311 in the head 310 may be fixed in its shape/configuration, or may be dynamic, with one or more moving parts that affect the output spray. For example, nozzle 311 could incorporate a leaf-shutter 400 to modify the total area of the aperture through which a single linear jet of water escapes (see FIGS. 5A and 5B). Alternatively, the output stream may pass through a number of smaller apertures 410 which can be selectively opened or closed to control directions in which smaller jets of water are sprayed (see FIGS. 5C and 5D). Alternatively, the opening may be configured as a slit or linear aperture 415 that causes a fan-shaped spray of water having an arc of output to the left and right of the direct line out from the wand (see FIGS. 5E and 5F), in which case the angle or width of the arc may be modified by incrementally closing a shutter 416 from the sides of the aperture 415. Dynamic nozzles can, by modifying the total area of the opening through which water escapes or which openings remain open, affect the pressure at which the water leaves the nozzle, as well as its direction and total area affected by the spray.

In a preferred embodiment, nozzle 311 is directed as a normal to the plane of the brush 315, so that if water output and brushing occur simultaneously, they will both be directed against a same surface. In an alternative embodiment, the nozzle 311 and brush 315 may be arranged perpendicular to one another, so that the user is encouraged to alternate between spraying water with the wand 300 held at one angle with the brush 315 inactive, and then rotating the wand 300 to apply the brush 315 to the surface with the water flow inactive.

Wand 300 may include one or more external sensors 301 or sensor/emitter pairs 301 and 302 in the wand head 310. In one embodiment, external sensors 301 could include a camera aligned to record images along a line of sight parallel to the direction of the wand's spray (see FIGS. 6A and 6B). In another embodiment, emitter 302 could produce pulsed laser light, and external sensors 301 could include an optical sensor capable of receiving or detecting pulses reflected off the surface of the vehicle, in order to determine a distance to the vehicle based on lidar or similar light-based rangefinding methods (see FIG. 6C). In another embodiment, emitter 302 could produce ultrasonic (or subsonic, or audible) waves and external sensors 301 could include a microphone capable of receiving or detecting echoes of the sound waves off the surface of the vehicle 100 to determine the distance based on sonar (see FIG. 6D).

The wand 300 may also include one or more internal sensors 303, including, for example, a gyroscopic sensor, gravimeter, or one or more accelerometers. Internal sensor 303 may be able to detect the orientation of wand 300 in space (e.g., whether it is being held upright, or at an angle to the ground, and whether it has been rotated to point away from the vehicle instead of towards it). The internal sensor 303 may also include a pressure sensor that determines the existence or absence of pressure against the brush 315 (i.e., whether the bristles of the brush are actually in contact with a rigid surface, and if so, how hard the surface is resisting the bristles). As an alternative to a sensor that specifically determines pressure on the brush 315, a sensor effect may be achieved by proxy by having bristles of the brush 315 which can be pushed/retracted back into the head in response to external pressure, and estimating an amount of pressure based at least in part on a length by which the bristles have been pressed back into the head by contact with an external surface of vehicle 100.

In another embodiment, the internal sensor 303 or external sensor 301 may include a thermometer for determining the air temperature at which the wand 300 is being used. In response to a low air temperature, a heating element preferably in the pump 205 may be activated, ensuring that the outgoing water is warm enough to clean and run off the vehicle without immediately freezing. Similarly, a heater in the wand 300 may be activated either to change the output water temperature, or to make it more comfortable to hold by a user lacking gloves in cold weather.

The wand 300 may have a wireless communications interface 304 for communicating either with a similar wireless communications interface in controller 220 of pump 205 or in a mobile computing device 350 held by a user during operation of the system. The wand 300 may also include a software controller 305 for interpreting data received by wireless communications interface 304, for causing data from external sensor 301 or internal sensor 303 to be transmitted via wireless communications interface 304, or for controlling one or more aspects of brushes, nozzles, or other features of wand 300, as described further below.

Additional convenience features may be integrated into wand 300. For example, a light may be integrated into the wand for illumination in situations where the wand is being used at night or in poor lighting conditions. The illumination could be automatically activated and deactivated based on an ambient light level determined by one or more of external sensors 301 (such as a camera or optical sensor) or based on time of day from an internal clock or clock reading supplied by a mobile computing device held by the user, so that a user does not need to fumble with buttons or switches to have a light source when it is dark and the system is being set up or used.

FIGS. 5A-5F illustrate three water jet styles for nozzles, each with a fully open mode and a partially closed mode, through which jets or streams of water (denoted with dashed arrows in each figure) may pass.

Figure 5A:
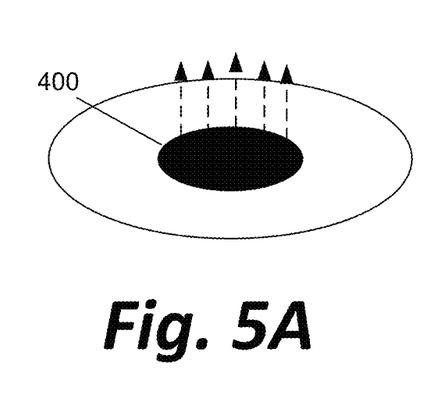
FIGS. 5A-5F illustrate three water jet styles for nozzles, each with a fully open mode and a partially closed mode.
Figure 5B:
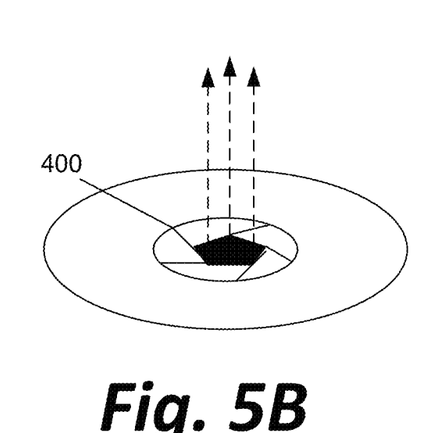

In FIG. 5A, a leaf shutter 400 is fully open, causing a wider single jet of water to leave at a lower velocity. In FIG. 5B, the leaf shutter 400 is partially closed, causing a reduction of the area of the opening, tightening the spray of the output water stream, and increasing the output pressure/velocity.

Figure 5C:
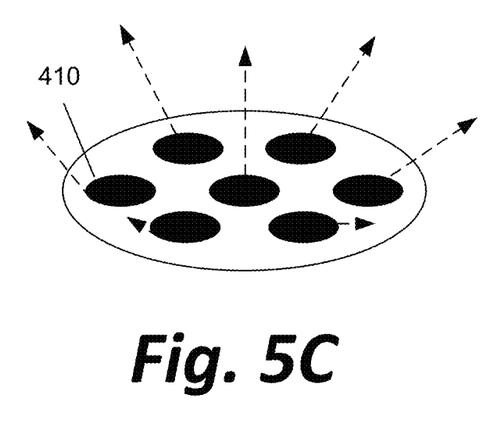
Figure 5D:
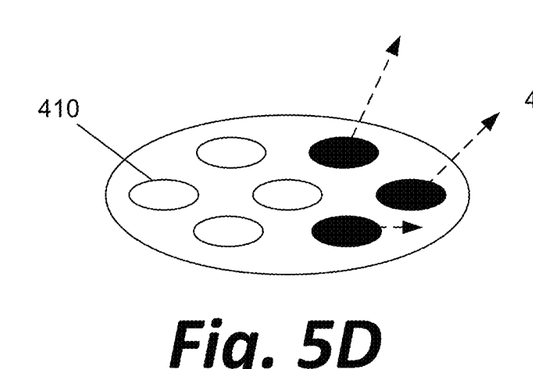

In FIG. 5C, the nozzle 311 includes, for example, seven apertures 410, each set into the wand at a slightly different angle. In FIG. 5D, all but three of the apertures 410 have been closed, causing the nozzle 311 to selectively spray off-center, to the right (unless the user rotates the wand to compensate), and again increasing the output pressure/velocity of the output water stream. It is understood that a different number of apertures 410 may be incorporated into the nozzle 311 and that the disclosure is not limited to the specific example described above and illustrated in the drawings.

Figure 5E:
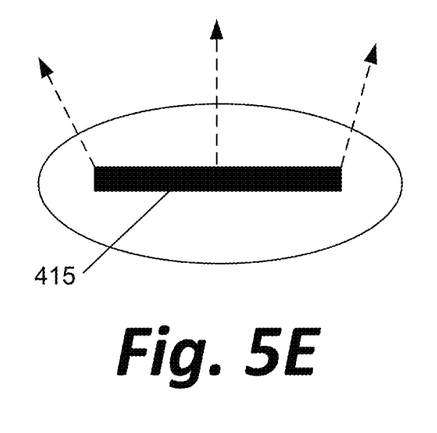
Figure 5F:
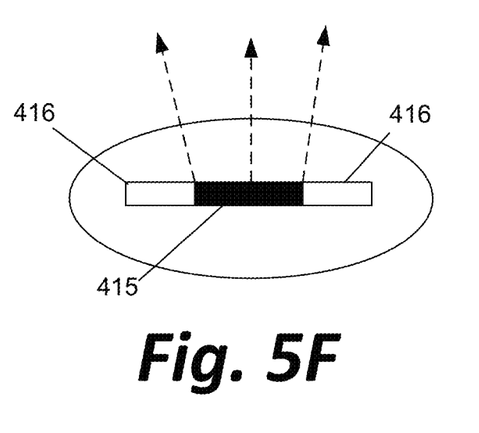

In FIG. 5E, the nozzle 311 includes a linear aperture 415 that allows a fan spray outward in a predefined arc. In FIG. 5F, the shutter 416 closes partially from the sides, narrowing aperture 415, reducing the angle of the output spray, and increasing the output pressure/velocity of the water stream.

FIGS. 6A-6D depict, in simplified form, three ways of using an external sensor to determine distance from the wand 300 to the surface being washed.

Figure 6A:
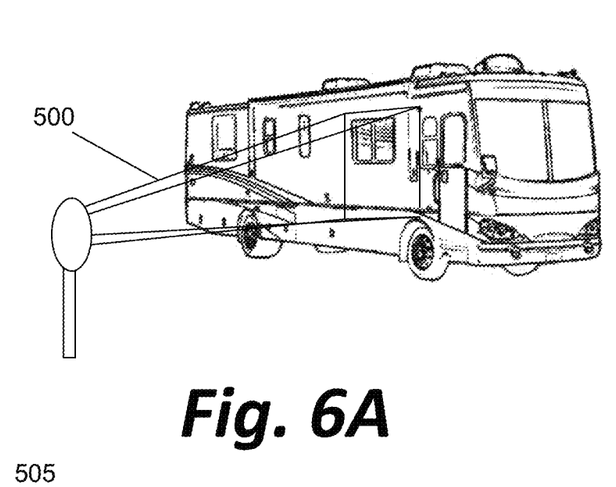
FIGS. 6A-6D depict, in simplified form, three ways of using an external sensor to determine distance from the wand of the pressure washer to the surface being washed.
Figure 6B:
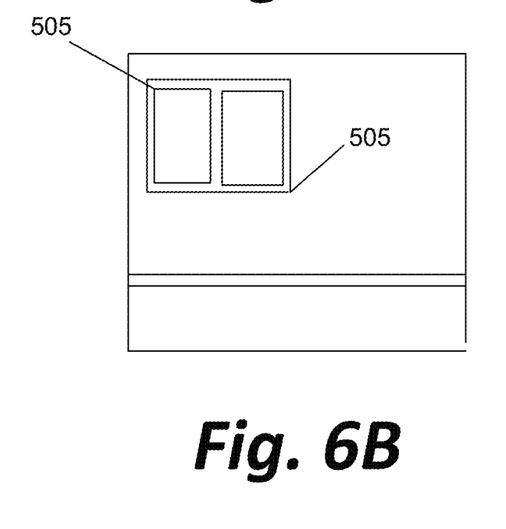

In FIG. 6A, a camera (sensor 301 of FIG. 4) in wand 300 receives visual data of the vehicle 100. The contents of the viewpoint 500 are shown in FIG. 6B, a representative image captured by the camera.

Camera data may be used to determine additional qualities of the surface that are more difficult to determine from a sonar or lidar determination alone. For example, a camera 301 may be able to determine, based on color or edge-recognition, the presence of detritus, such as mud, bird droppings, or dead insects on the surface of the vehicle.

A camera 301 may be able to determine the distance to and orientation with respect to the vehicle by triangulation, given two or more known points on the surface of the vehicle. For example, if two opposite corners 505 of a window, or two opposite corners of a license plate, or two other features of the exterior surface of the vehicle are known to have a fixed distance between them, an apparent distance between them in the received image may be used to calculate the distance from the camera sensor to those two points. In some embodiments, the exterior of the vehicle 100 may be modified to add additional reference points, such as light emitting diodes that emit infrared light that can be picked up by the camera, or adding small decals at predetermined locations that will be visible to the camera 301.

In some embodiments, a 3D model of the vehicle may be loaded into memory used by the computing device determining the distance, in order to aid in analysis of the data received by the camera. Comparison of visible features of the exterior received by the camera with the 3D model stored in memory may allow for precise determination of the camera distance and angle that would produce the image currently being received by the camera.

Analysis of the camera data received may also be used to determine the silhouette of the vehicle and the edges of it, to determine whether the vehicle is actually in the line of spray of the wand 300, or if the spray is partially or completely missing the vehicle 100.

Figure 6C:
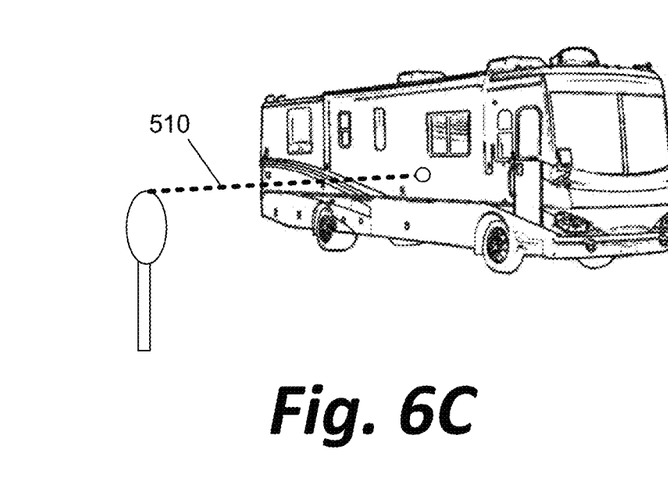

In FIG. 6C, emitter 302 in wand 300 produces a laser pulse 510, which reflects off the surface of the vehicle and is received by sensor 301. By determining either the time difference between production and reception of the pulse, or by determining some quality of the sensed laser (e.g., a reduction in intensity, the size of a focused dot of light on the vehicle surface, etc.), a distance to the vehicle surface may be accurately determined.

Figure 6D:
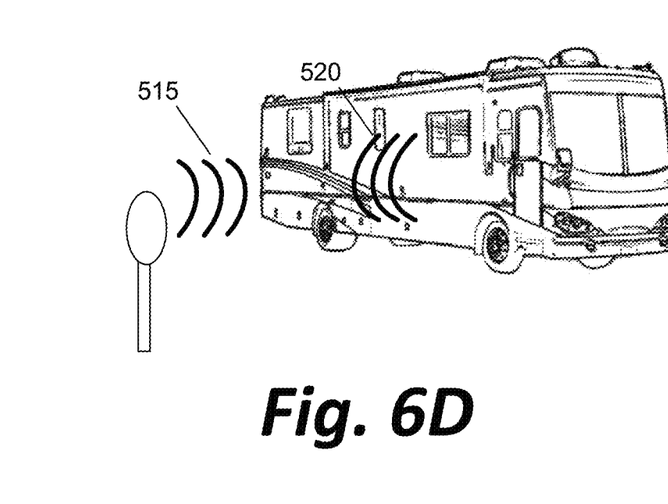

In FIG. 6D, emitter 302 in wand 300 produces ultrasonic waves 515, which reflect or echo off the surface of the vehicle and are received as echoes 520 by sensor 301 (a microphone). By determining the time difference between the production of the waves and reception of their echoes, a distance to the vehicle surface can be determined. Although this embodiment is not preferred (as the sound waves may strike a closer surface of the vehicle than the surface directly targeted by the output from the wand), the use of multiple microphones or directional microphones in wand 300 may mitigate potential error and produce more accurate readings.

Any of the three distance determining methods may be supplemented by other sensor data to get more precise distance data or other data about the surface at which the wand 300 is currently pointing. For example, by combining real-time accelerometer data with distance estimation by a sonar or lidar system, an angle of the surface with respect to the wand may be determined, by calculating that a given amount of rotation of the wand results in a given change in the calculated distance from the line of the emitter to the surface and back to the sensor.

In some embodiments, interpretation of the data may be performed by a microchip or computing device in the wand 300 itself. In other embodiments, the data may be transmitted in real time to a mobile computing device held by a user of the system, in order to take advantage of increased processing power of that device. The information determined by the device may be transmitted back to the wand 300, or may be used to issue commands to the wand 300 or pump 205. Data connections between the wand 300, pump 205, and mobile computing device may be facilitated by, for example, a WiFi hotspot generated by the mobile computing device itself, an existing WiFi network at a location where the vehicle is parked, a WiFi network of the vehicle itself, or another localized wireless networking protocol, such as Bluetooth or near field communications.

Figure 7:
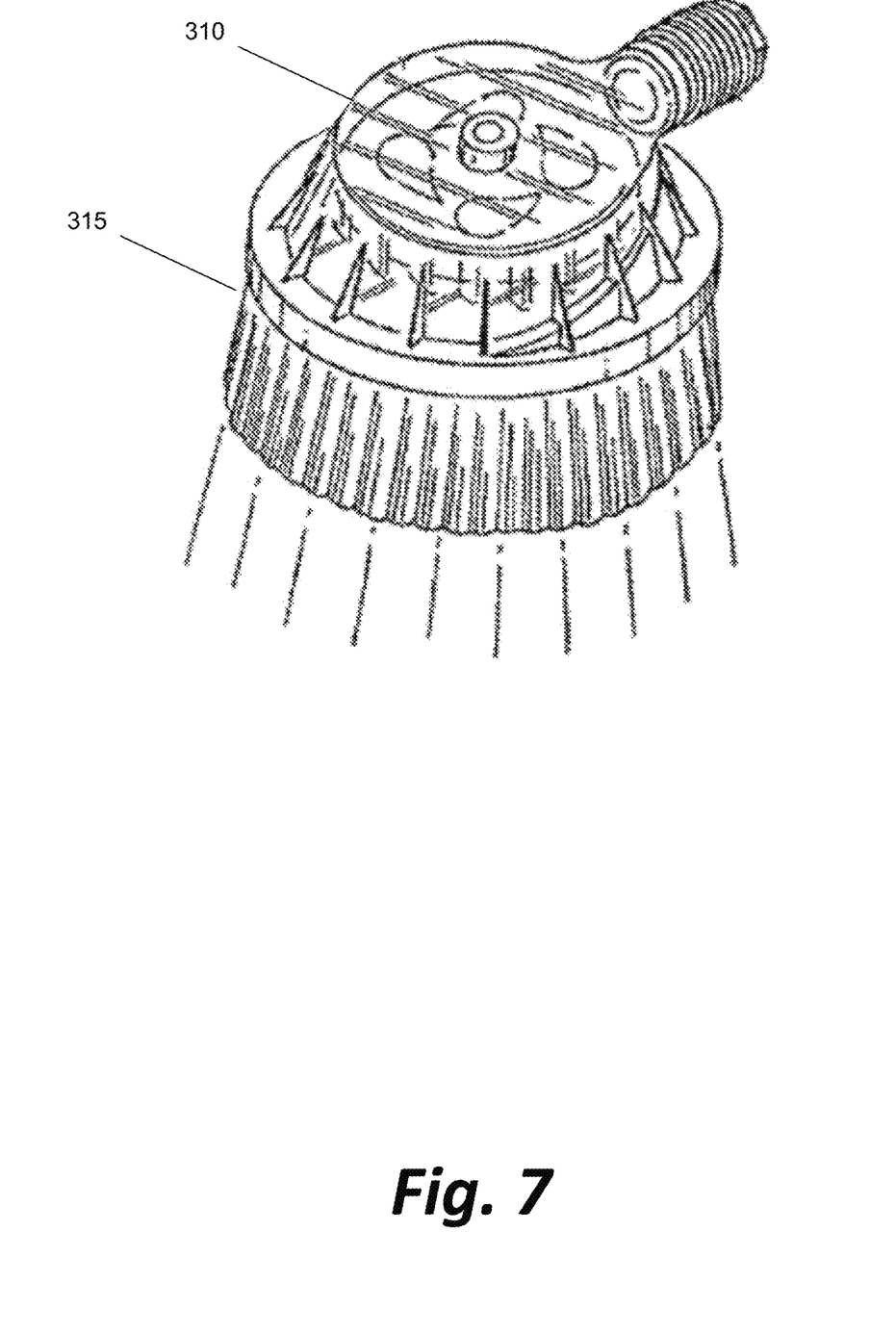
FIG. 7 depicts a rotating brush at the end of wand.

FIG. 7 depicts a head 310 and brush 315 at the end of a wand 300.

In a preferred embodiment, where the brush is capable of rotation, the output spray of the wand 300 should be normal to the plane of rotation of the brush (i.e., downward, in the context of the illustration of FIG. 7). In other embodiments, the output spray may be directed along the plane of the rotation of the brush (i.e., out of the "top" of the wand, without turning to spray out the "side").

The output from the nozzle 311 may be from the center of the brush 315, so that the brush surrounds and optionally rotates around the nozzle, or the nozzle may be placed at some point on the wand next to or fully independent of the brush 315.

Figure 8:
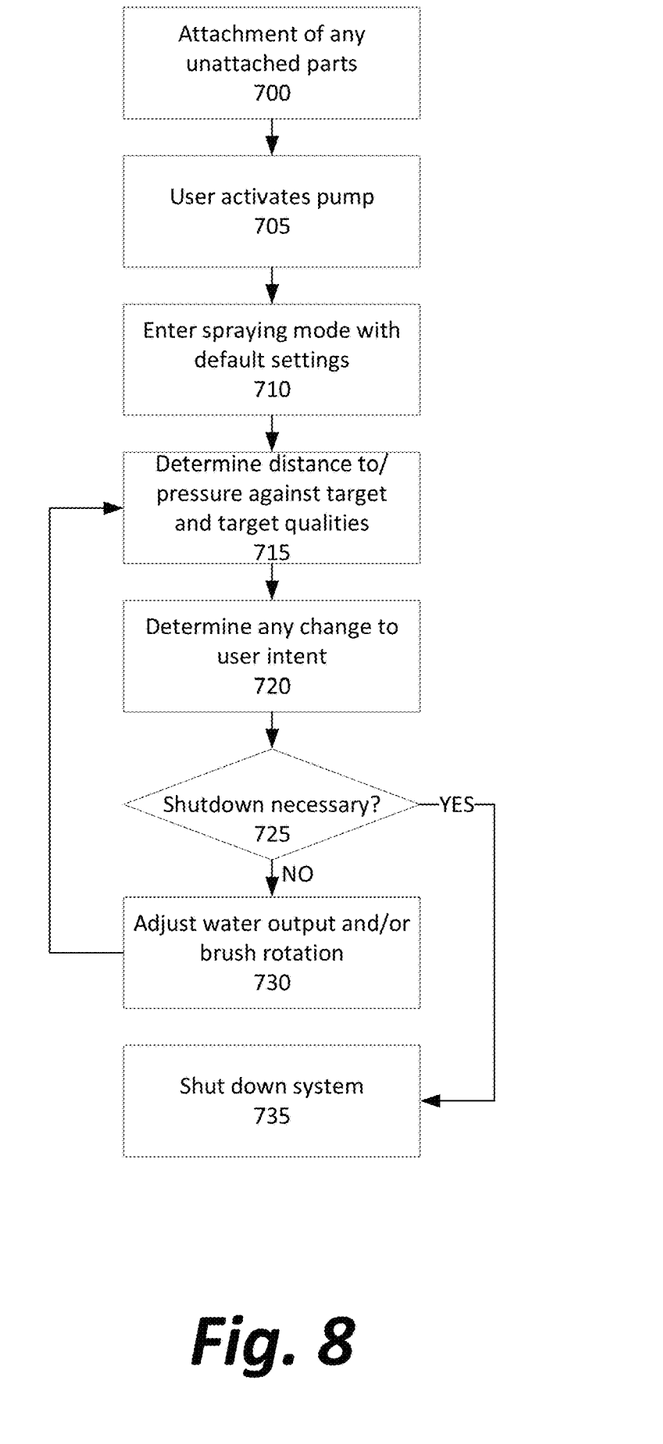
FIG. 8 depicts, in simplified form, a flow chart of a preferred method of controlling a pressure washing system.

FIG. 8 depicts, in simplified form, a preferred method of controlling a pressure washing system.

Initially, the user attaches the pressure washer wand to the vehicle's pump system, or obtains a wand already attached to the system (Step 700). In a preferred embodiment, the pressure washer wand 300 and the quick-connect hose 160 may be attached to a port 155 in the outer surface of the vehicle 100, as previously described above.

Next, the user activates the pump 205 (via software controller 220) and the pressure washer wand 300 to begin communicating with one another (Step 705). In a preferred embodiment, both the wand 300 and the pump 205 are always listening for an incoming wireless communication, which may be supplied by a mobile computing device (such as a mobile phone) running an app installed on the device and configured to work with that unique wand and pump (in order to avoid accidentally activating any other pressure washer system of the same model that happens to be in range of the wireless signal). The configuration of the app to run with only that pump 205 and wand 300 may include, for example, a user having entered or saved a password in the app, or the app having been previously mated with the pump and wand during an initialization process and saving a unique identifier for each, such that it will only issue commands associated with that unique identifier, and only that wand and pump will react to those commands. In an alternative embodiment, the pump and wand may each simply have a power button or switch that is manually activated to indicate that the user is ready to begin using the system, and the two components may directly wirelessly communicate with each other, rather than indirectly through the mobile computing device.

As a result, the pressure washing system enters a spraying mode (Step 710), activating the pump 205 and causing water to begin exiting the wand 300 at a default starting pressure. If previous uses of the system led to the user selecting output settings different from the "factory default," these settings may be retrieved from memory in the wand 300, pump 205, mobile computing device 350, or other non-transitory memory storage, and those settings may be used rather than factory default settings.

At every moment of use, the wand 300 may use any sensors 301, 302, 303 available to it to determine the distance from the wand 300 or the brush 315 to the vehicle surface being washed, as well as any other qualities of the target surface (Step 715).

Methods of determining distance have already been discussed in regards to FIGS. 6A-6D, above, as well as the use of a pressure sensor to determine that the brush 315 is pressed into contact against the vehicle's target surface. Additional qualities of the target surface which may be determinable—especially if sensor 301 includes a camera, but even conceivably with lidar, sonar, pressure sensor, or other sensor types—could include: the angle at which the output stream of water strikes the point being targeted, any difference of height between the wand 300 and the point being targeted, whether the targeted point is on a surface of glass, metal, or another substance such as a decal/bumper sticker, whether there is detritus on the targeted surface (including, for example, mud, dust, bird droppings, dead insects, etc.), and/or whether there is rust or other damage on the targeted surface.

The determination could also include determining that vehicle 100 is not being effectively targeted by the user at all. For example, if the data from external sensor 301 or internal sensor 303 includes camera data showing that the wand 300 is on the ground, or accelerometer data showing the wand 300 was in freefall for a predetermined time period (e.g., a portion of a second), a determination may be made that the wand has actually been dropped or is otherwise no longer under the user's direct control, and that the spray should be shut off even if the wand's squeeze trigger or other flow control component remains depressed for some reason. Similarly, if the user turns around and is no longer facing vehicle 100 at all, camera or accelerometer data from sensors 301 or 303 may determine this fact and shut off output water flow to conserve water or avoid spraying other extraneous targets. If a camera or other sensor determines that the targeted point is actually an open window or open door of vehicle 100, or that the targeted point is actually on a person or pet standing in front of vehicle 100, this determined information may be used to decide to shut off the spray and avoid injury to the person or pet or property damage to the inside of the vehicle. Similarly, an internal sensor 303 of the wand may determine a drastic drop in water pressure supplied to the wand, indicating a possible leak in piping or the hose, problems with the pump, or disconnection of the hose, resulting in a situation where the pump should be shut down to avoid water damage or waste of water.

The system will also constantly determine whether the user has requested any change to the nature of the water output from the pressure washer (Step 720). Examples of requested changes might include, but are not limited to, activating a heating element to heat the water before it leaves the wand; turning off a heating element; increasing or decreasing the output temperature; changing to a predefined output pressure setting such as high, medium, or low; changing to a precise output pressure setting such as, for example, "exactly 30 PSI (pounds per square inch)" (or another PSI value, which may be any value from 0 PSI to 60 PSI or more, with software potentially limiting values that would be damaging to a car's surface, difficult to control by a human user, or dangerous to human life); incrementing or decrementing a pressure setting; overriding a system-determined pressure setting (for example, setting the pressure to the maximum safe setting for the pump, even though it raises the possibility of damaging the surface of the vehicle); adding soap to the water output; adding another chemical or cleaning agent to the water output; activating or deactivating rotation of brush 315; changing a speed or direction of rotation of brush 315; changing a pattern of rotation of brush 315; or changing an amount of power supplied to rotate brush 315 against the friction of a surface.

A user desire for any of these options might be indicated by, for example, a user pressing a button, switch, or dial on the wand 300; a user pressing a button, switch, dial, or other interface element on the pump 205; a user pressing a virtual button or engaging with other graphical user interface elements in a mobile app on a phone or other mobile computing device 350; or another input method, such as (but not limited to) voice or gesture control that can be detected by a microphone or camera of the wand 300 or of the mobile computing device 350.

After potentially checking whether the system should turn off for safety or property damage reasons (as part of Step 715), and after checking whether the user has indicated that they wish to turn off the system (as part of Step 720), and potentially checking itself to determine if, for example, an overpressure, leak, short-circuit, or other damage has occurred in the pump itself, the system determines whether a shutdown is necessary or requested (Step 725). If a shutdown is necessary or requested, the system will proceed to spin down the pump to a stop, or to immediately shut down the pump, as appropriate for the severity of the situation (Step 735). As part of an emergency shut off, a valve in pipe 210, pipe fitting 215, or wand 300 may be closed, or a shutter or aperture in wand 300 may be closed, to prevent flow even if the pump's output pressure has not yet been reduced to zero.

If a shutdown is not requested or necessary, the system may adjust output water pressure and brush behavior (Step 730) in response to any changes in the target surface or the user's intent, as determined previously (Steps 715 and 720).

Possible triggers and their associated changes in output water pressure may include (but are not limited to): changing water pressure to a value or setting selected by a user; decreasing water pressure when the brush 315 is pressed against the external surface of the vehicle with greater force; increasing water pressure when the angle indicates only a glancing blow of the spray against the surface is being provided; increasing pressure if the spray is working against gravity to strike a target at a higher elevation, or decreasing pressure if the spray is working with gravity to strike a target at a lower elevation; modifying the pressure to the highest level that will not damage the given surface, such as windshield glass, a side mirror, a decal or bumper sticker, or the external pane; increasing pressure so long as detritus remains present on the surface; decreasing pressure if there is rust or other damage on the targeted surface; decreasing pressure to a minimum level if the targeted point is an open window, open door, person, or pet.

A change in the output water pressure may be accomplished either by a change in the output volume or velocity of the pump, or by a change in the output configuration of the wand (for example, closing or narrowing an aperture through which water exits the wand, to increase the output velocity and pressure even without a change in output volume).

Further, some nozzle types may allow for more directed responses to a determination that water is being sprayed on or at something that is not desired. For example, as a user passes a wand with multiple apertures (as illustrated in FIGS. 5C and 5D) over an exterior with an open window, the apertures could be selectively opened and closed during motion so that no individual jet of water ever passes through the window, even though the rest of the surface is thoroughly cleaned. Similarly, if a user is spraying near an edge of the vehicle with a nozzle having a linear aperture that generates a fan-shaped spray (as illustrated in FIGS. 5E and 5F), a shutter could close over the aperture as the spray approaches the edge of the vehicle, so that no water is wasted and the spray is no wider than is necessary to be actively cleaning the vehicle at all times.

Similarly, possible triggers and their associated changes in brush behavior may include: changing brush velocity to a value or setting selected by a user; ceasing movement of the brush head when the brush is not in contact with the vehicle's exterior (and therefore is wasting energy without scrubbing anything); increasing power to the brush when the brush is pressed hard against the surface and friction is increased; decreasing or increasing brush power in response to an increase or decrease in water pressure, so that the decreased work done by one system is mitigated by the increased work done by the other system; increasing power or speed to the brush when detritus is present and is not diminishing at the current power level; decreasing power or speed to the brush when a more sensitive surface is being scrubbed, such as a decal, bumper sticker, windshield, or mirror; and changing the brush from a single direction of rotation to alternate directions and scrub back and forth, in response to the presence of detritus that is not diminishing.

The system may also enact any requested user changes, including the addition of soap or other chemicals to the output spray; the initiation or ending of heating of the water in the pump or wand, or the turning on or off of any assistive lighting or other convenience features in the wand.

After adjusting output, the system continuously returns to polling for changes to the target surface and user intent (repeating Steps 715, 720, and 725) until the system is shut down.

Figure 9:
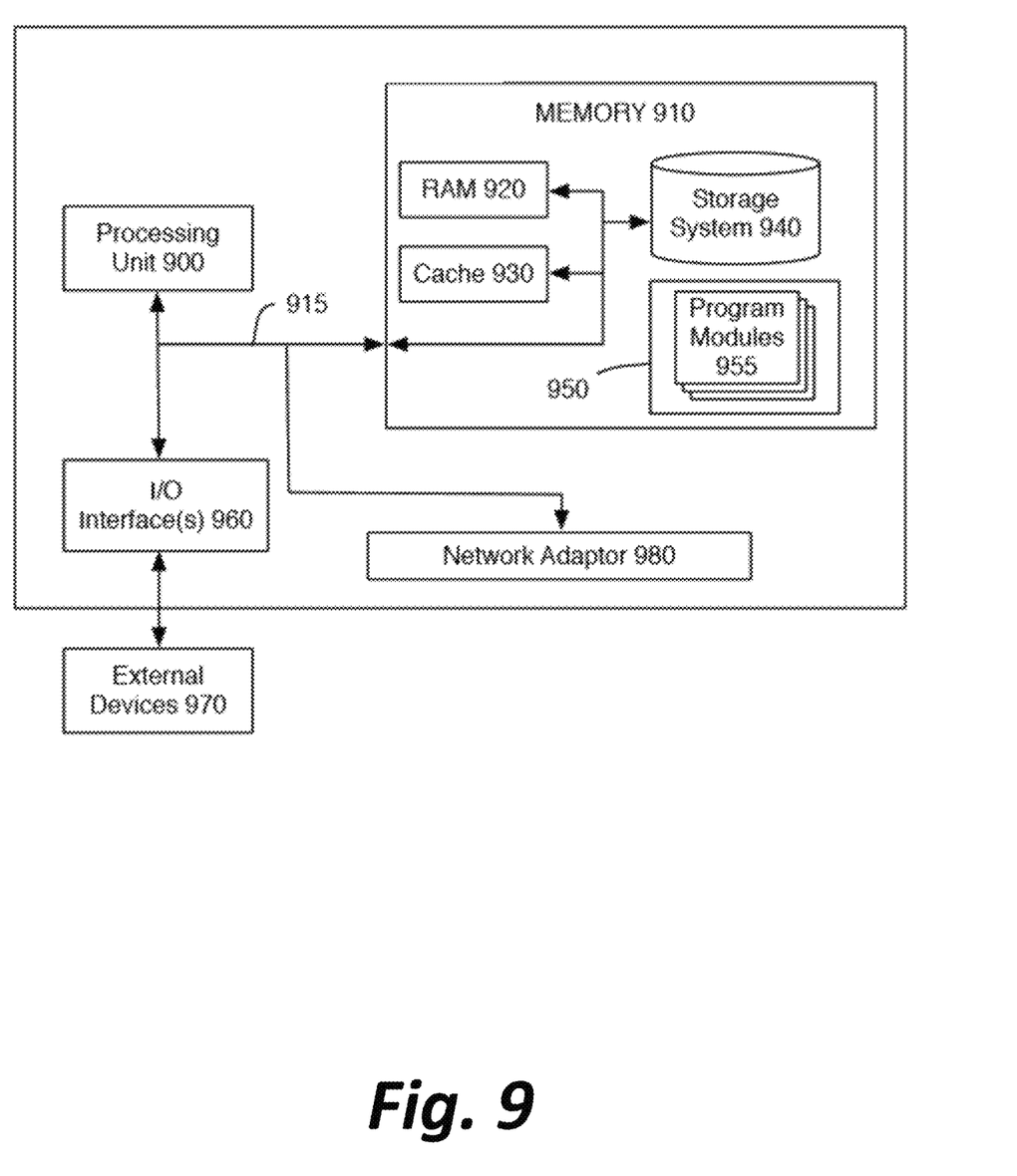
FIG. 9 is a high-level block diagram of a representative computing device that may be utilized to implement various features and processes described herein.

FIG. 9 is a high-level block diagram of a representative computing device that may be utilized to implement various features and processes described herein, for example, the functionality of mobile computing device 350, software controller 220, or of software controller 305. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 9, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A pressure washing system for a vehicle, comprising:
a pump;
a processor;
a wand in fluid communication with the pump, directing water pressurized by the pump, and comprising a pressure sensor and a brush;
wherein, while the pump is active, the processor continuously determines a pressure of the brush against an external surface of the vehicle, and, based at least in part on the determined pressure, automatically causes a modification of an output pressure of water from the wand.

2. The pressure washing system of claim 1, wherein the brush is a rotating brush, and wherein, based at least in part on the determined pressure, the processor automatically causes a modification of a speed of rotation of the brush.

3. The pressure washing system of claim 2, wherein the modification of the speed of rotation or the modification of the output pressure of water are automatically caused based at least in part on a determination of a material of the external surface.

4. The pressure washing system of claim 2, wherein the modification of the speed of rotation or the modification of the output pressure of water are automatically caused based at least in part on a sensed presence of detritus on the external surface.

5. The pressure washing system of claim 1, wherein the wand further comprises one or more distance-finding sensors, wherein the processor continuously determines a distance of the wand from the external surface of the vehicle and wherein, based at least in part on the determined distance, the processor automatically causes a modification of an output pressure of water from the wand.

6. The pressure washing system of claim 5, wherein the brush is a rotating brush, and wherein, based at least in part on the determined distance, the processor automatically causes a modification of a speed of rotation of the brush.

7. The pressure washing system of claim 1, wherein a mobile computing device is used to create a communications bridge between the wand and the pump.

8. The pressure washing system of claim 1, wherein an application running on a mobile computing device is used to initiate and to end output of pressurized water.

9. The pressure washing system of claim 8, wherein modification of the output pressure of water occurs based at least in part on one or more commands issued via the application.

10. A pressure washing system for a vehicle, comprising:
a pump;
a processor;

a wand in fluid communication with the pump, directing water pressurized by the pump, and comprising a pressure sensor and a rotating brush;

wherein, while the pump is active, the processor continuously determines a pressure of the brush against an external surface of the vehicle, and, based at least in part on the determined pressure, automatically causes a modification of a speed of rotation of the brush.

11. The pressure washing system of claim 10, wherein the wand further comprises one or more distance-finding sensors, wherein the processor continuously determines a distance of the wand from the external surface of the vehicle and wherein the processor automatically causes the modification of the speed of rotation of the brush based at least in part on the determined distance.

12. A pressure washing system for a vehicle, comprising:

a pump;

a processor;

a wand in fluid communication with the pump, directing water pressurized by the pump, and comprising one or more distance-finding sensors and a rotating brush;

wherein, while the pump is active, the processor continuously determines a distance between the wand and an external surface of the vehicle, and wherein, based at least in part on the determined distance, the processor automatically causes a modification of a speed of rotation of the rotating brush and automatically causes a modification of an output pressure of water from the wand.

* * * * *